Sept. 17, 1940.  W. W. SLOANE  2,215,338
DRIVE MECHANISM FOR SHAKER CONVEYERS
Filed June 10, 1938  2 Sheets-Sheet 1
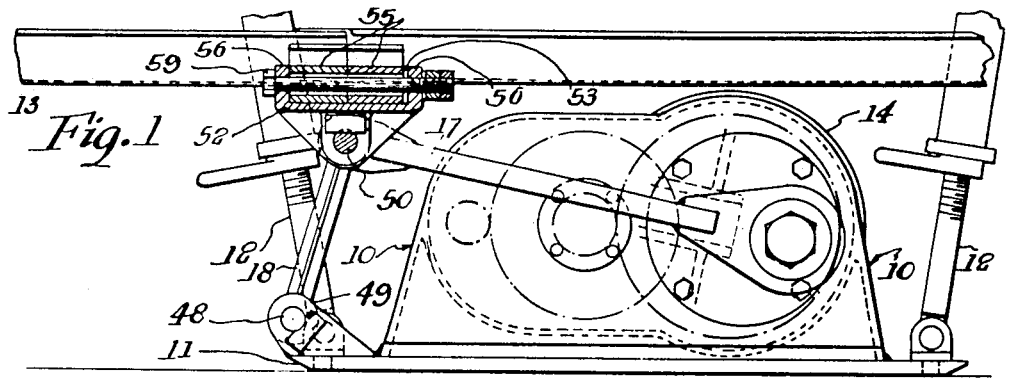
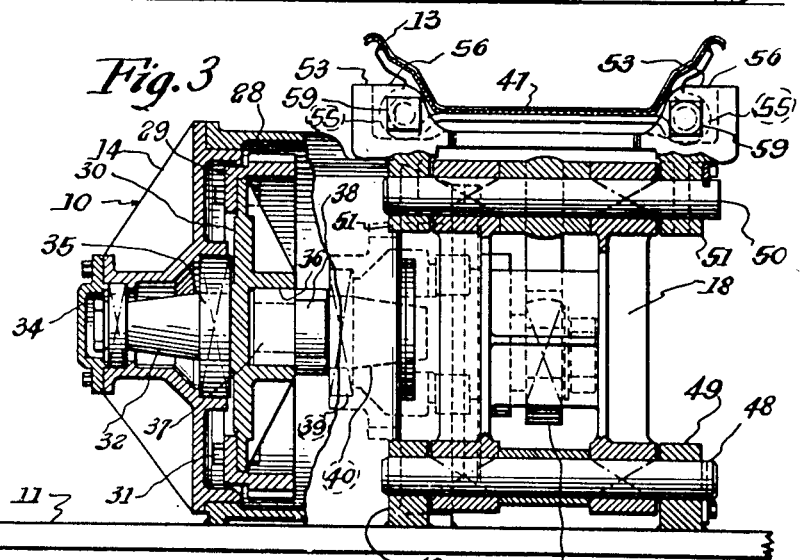
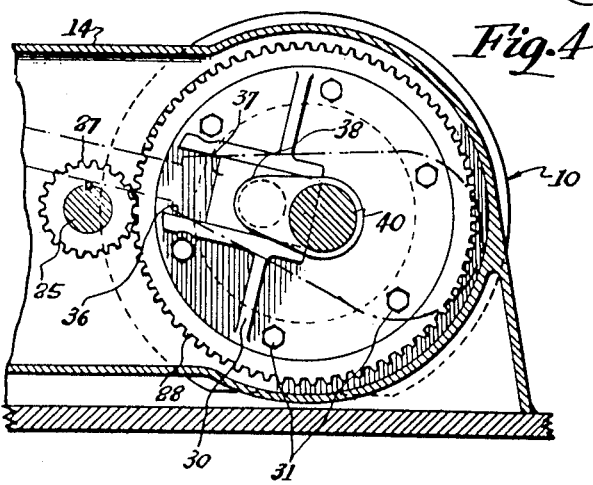
Inventor
William W. Sloane
Clarence P. Poole
Attorney Sept. 17, 1940.  W. W. SLOANE  2,215,338
DRIVE MECHANISM FOR SHAKER CONVEYERS
Filed June 10, 1938  2 Sheets-Sheet 2
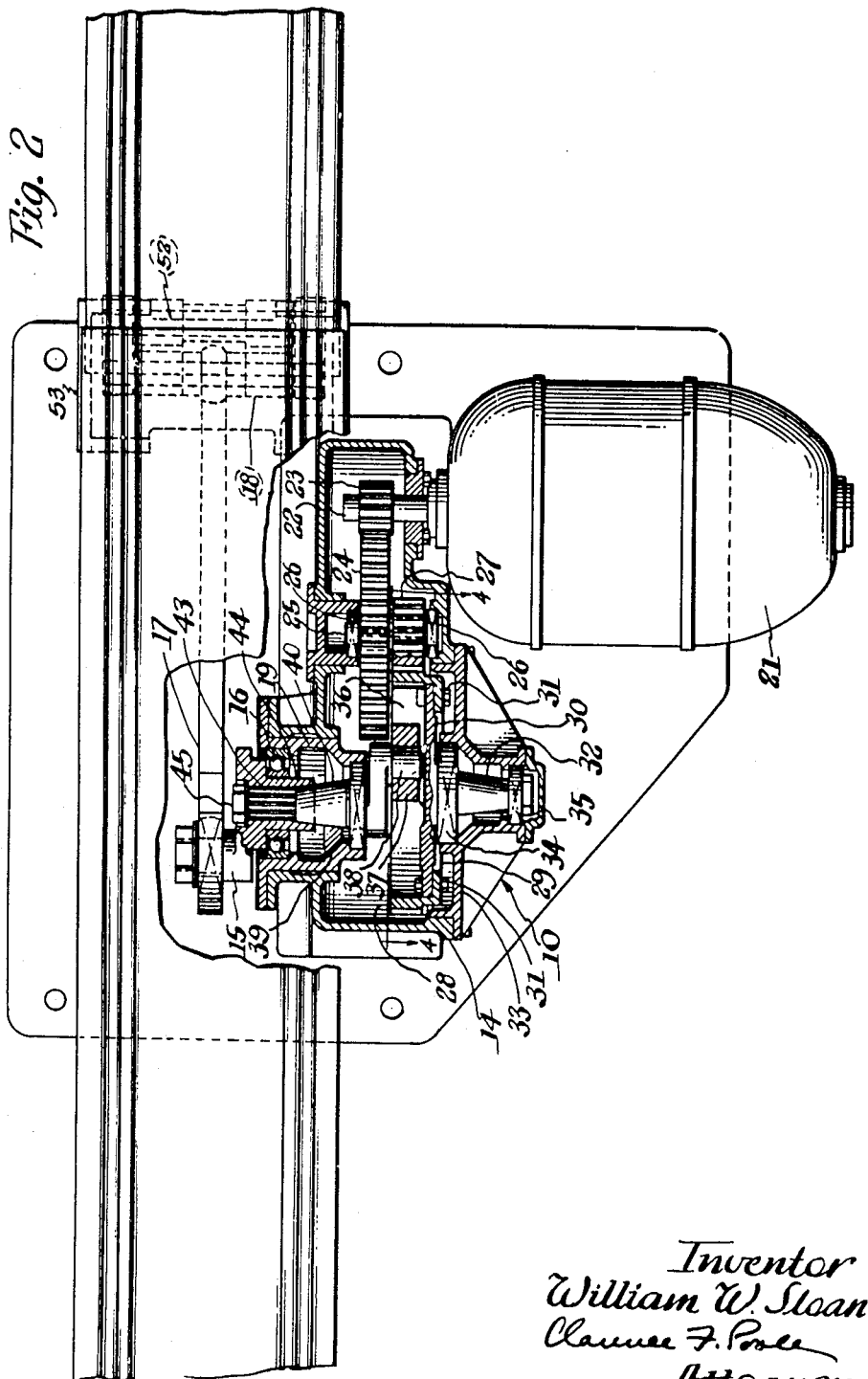
Inventor
William W. Sloane
Clarence F. Poole
Attorney Patented Sept. 17, 1940

2,215,338

UNITED STATES PATENT OFFICE 2,215,338

DRIVE MECHANISM FOR SHAKER CONVEYERS

William W. Sloane, Chicago, Ill., assignor to Goodman Manufacturing Company, Chicago, Ill., a corporation of Illinois Application June 10, 1938, Serial No. 212,893

17 Claims. (Cl. 198—220)

This invention relates to improvements in drive mechanisms for shaker conveyers of the type utilized for conveying loose material such as coal.

This invention utilizes a mechanism for varying the angular velocity of a drive crank for reciprocably driving a conveyer, which operates on principles somewhat similar to those disclosed in an application Serial No. 111,773, filed by me on Nov. 20, 1936, now Patent No. 2,200,136, dated May 7, 1940, but differs therefrom in certain features of the motion varying mechanism, which results in an improved conveying motion.

My present invention has among other objects to improve upon the type of drive mechanisms disclosed by said application by producing a simpler and more rugged and economical arrangement of parts for varying the angular velocity of the crank which results in a more efficient conveying action.

Another object of my invention is to introduce a rocking member as an element of the drive, which forms a support and driving member for the conveyer trough line, and which makes it possible to efficiently drive the trough line through a pitman connected to a rotating crank and eliminate the tendency for the trough line to jump, and also to arrange the rocking member and pitman in such a manner as to reduce any side thrusts or angular components of force which may be imparted to the trough line by the rocking member and pitman.

Another object of my invention is to provide a drive connection for the trough line which renders the use of connecting and guiding frames for the trough line unnecessary and serves to connect adjacent ends of a pair of troughs of the trough line together.

Other objects of my invention will appear from time to time as the accompanying specification proceeds.

My invention may be more clearly understood with reference to the accompanying drawings wherein:

Figure 1 is a view, in side elevation, of a shaker conveyer drive and trough line constructed in accordance with my invention;

Figure 2 is a plan view of the drive and trough line drawn to an enlarged scale, with part of the trough line broken away and parts of the drive shown in horizontal section;

Figure 3 is an enlarged end view of the drive and trough line with parts of the drive mechanism and the supporting and connecting means for the trough line shown in transverse section; and Figure 4 is a partial fragmentary sectional view of the drive mechanism drawn to the same scale as Figure 3 and taken substantially along line 4—4 of Figure 2.

Referring now to the drawings which illustrate a preferred embodiment of my invention, a shaker conveyer drive mechanism generally indicated by reference character 10 is provided. Said drive mechanism is mounted on a base plate 11 which is adapted to be held in position on the mine bottom in a usual manner; as for instance, a plurality of jacks 12, 12 adapted to engage suitable sockets formed in said base plate. A casing 14 is mounted on said base plate and forms a bearing support and closure means for the mechanism for driving a crank 15 at a variable angular velocity. Said crank projects outwardly from said casing and forms a drive means for the conveyer, and is journaled in one end wall of said casing on a ball bearing 16, mounted in a flanged bearing support sleeve 19. A pitman 17 is journaled on the outer end of said crank and has driving connection with a rocking member 18 mounted on the base plate 11 and disposed outside of the casing 14. Said rocking member forms a means for driving a shaker conveyer trough line indicated generally by reference character 13, in a manner which will hereinafter more clearly appear as this specification proceeds.

A motor 21, which is herein shown as being an electric motor of an ordinary construction, is mounted on the base plate 11 and has an armature shaft 22 projecting within said casing. A pinion 23 is mounted on said armature shaft and meshes with and drives a spur gear 24 on a shaft 25 journaled at its ends, in opposite end walls of said casing, on ball bearings 26, 26. A pinion 27 is likewise mounted on said shaft and driven therefrom, and meshes with and drives an annular gear 28. Said annular gear is herein shown as being provided with an inwardly projecting annular flange 29 which is secured to a web 30 by nuts and bolts 31, 31. The web 30 is herein shown as being provided with an integrally formed outwardly projecting shaft 32 journaled in an end plate 33 of the casing 14 on ball bearings 34 and 35.

A channelled radial guide 36 is herein shown as being formed integrally with the web 30 on its side opposite from the shaft 32. Said guide has a block 37 slidably mounted therein, which is journaled on the end of a crank 38. Said crank is provided with a shaft 40, herein shown as being formed integral therewith and extending towards the crank 15. Said shaft is journaled in a ball bearing 39 mounted in the inner end of the flanged sleeve 19.

The crank 15 is driven from the shaft 40 by means of an inwardly extending internally splined sleeve 44, herein shown as being formed integral with said crank and engaged by a splined end 43 of said shaft. A nut 45 is threaded on the outer end of said shaft and abuts the outer end of the sleeve 44 for holding said shaft in engagement with said sleeve.

The axis of rotation of the shaft 40 and crank 15 is eccentric of the axis of rotation of the annular gear 28, and this eccentricity causes the crank 15 to be driven by the guide 36 and block 37 at an angular velocity which is varied in such a manner as to impart a reciprocable motion to the trough line 13 when connected thereto, which is gradually accelerated for a greater portion of the length of its forward stroke and rapidly decelerated for the remainder of its forward stroke, and which is rapidly accelerated for a short portion of its return stroke and gradually decelerated for the remainder of its return stroke.

Referring now to certain other novel features of my invention and the connecting, supporting and driving means for the trough line, the rocking member 18 rocked by the crank 15 through the pitman 17, forms a driving means for the trough line 13, and a support and connecting means for troughs 47, 47 of said trough line. Said rocking member is herein shown as being of an H-shaped formation (see Fig. 3), and is journaled on a transverse shaft 48 adjacent the lower ends of its legs. Said shaft is mounted at its ends in support brackets 49, 49, herein shown as projecting upwardly from, and as being welded to the base plate 11 adjacent one end thereof. The pitman 17 has driving connection with the opposite end of said rocking member between the legs thereof on a transverse shaft 50, and the longitudinal axis of said pitman is shown as being in alignment with the longitudinal center of the trough line to eliminate any side thrusts between the trough line and pitman. Said transverse shaft extends laterally beyond opposite sides of said rocking member and has opposite depending ends 51, 51 of a transversely extending trough support member 52 mounted thereon. A pocket 53 is formed at each side of said trough supporting member. Said pocket is adapted to receive abutting connecting ears 55, 55, projecting laterally from opposite sides of adjoining conveyer troughs 47, 47, and is provided with walls 56, 56 which abut opposite ends of said ears. Suitable connecting bolts 59, 59 are adapted to extend through the projecting end walls 56, 56 and ears 55, 55, for connecting the troughs together, and also securing the troughs to said trough supporting member.

It will be seen from the foregoing that the rocking member 18, which is rocked by the pitman 17, forms a driving and supporting means for the trough line, which is connected to said rocking member at the axis of pivotal connection of said pitman thereto, which reduces the angular thrusts that would be present if the trough line and pitman were each connected to the rocking member at different points.

It will also be seen that such an arrangement renders unnecessary the use of guiding members to hold the trough line from jumping movement in a vertical direction, and that the means for supporting the trough line on said rocking member also forms a means for connecting adjoining ends of the troughs together.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a shaker conveyer drive and in combination with a shaker conveyer trough line, a rotating crank, means for driving said crank at a variable angular velocity, a rocking member, a drive connection from said crank to the upper end of said rocking member, and a supporting and driving connection between said trough line and the upper end of said rocking member including a member rockingly supported on the upper end of said rocking member and forming a drive and support and connecting means for a pair of troughs of said trough line.

2. In a shaker conveyer drive and in combination with a shaker conveyer trough line, a rotating crank, means for driving said crank at a variable angular velocity, a rocking member, a drive connection from said crank to the upper end of said rocking member, and a supporting and driving connection between said trough line and rocking member including a member rockingly supported on the upper end of said rocking member and extending beneath and having connection with adjacent ends of a pair of troughs of the trough line for connecting said troughs together, and said member forming a drive and support means for said troughs.

3. In a shaker conveyer drive and in combination with a shaker conveyer trough line, a base, a crank, drive mechanism mounted on said base for driving said crank at a variable angular velocity, rocking member pivotally mounted on said base at one of its ends, a shaft mounted on the opposite end of said rocking member and extending beyond the sides thereof, a member pivotally mounted on the ends of said shaft and extending transversely beneath the trough line and having supporting and driving engagement therewith, and a pitman mounted on said crank and extending longitudinally along the longitudinal center of the trough line and having pivotal connection with said shaft intermediate the ends thereof.

4. In a shaker conveyer drive, a conveyer trough line including a plurality of troughs connected together at their ends, and means for reciprocably driving said trough line including a base, a casing mounted on said base, a rotating crank journaled in said casing, means disposed within said casing for driving said crank at a variable angular velocity, a rocking member mounted on said base outside of said casing, a pitman connected between said crank and the upper end of said rocking member, and a supporting connection between said trough line and rocking member including a member mounted on said rocking member coaxial with the axis of pivotal connection of said pitman thereto.

5. In a shaker conveyer drive, a conveyer trough line including a plurality of troughs connected together at their ends, and means for reciprocably driving said trough line including a base, a casing mounted on said base, a rotating crank journaled in said casing, means disposed within said casing for driving said crank at a variable angular velocity, a rocking member mounted on said base outside of the limits of said casing, a pitman connected between the upper end of said crank and rocking member, and a supporting connection between said trough line and rocking member including a member mounted on said rocking member coaxial with the axis of pivotal connection of said pitman thereto, said member extending transversely across said trough line and having supporting and connecting engagement with adjoining ends of a pair of troughs of said trough line.

6. In a shaker conveyer drive, a conveyer trough line including a plurality of troughs connected together at their ends, and means for reciprocably driving said trough line including a base, a casing mounted on said base, a rotating crank, means disposed within said casing for driving said crank at a variable angular velocity, a rocking member mounted on said base outside of the limits of said casing, a pitman connected between the upper end of said crank and rocking member, and a supporting connection between said trough line and rocking member including a member mounted on said rocking member coaxial with the axis of pivotal connection of said pitman thereto, each of said troughs having a pair of aligned ears projecting laterally from opposite ends thereof, and said connecting member having portions adapted to receive said ears for connecting said troughs together and forming a drive and supporting means for said troughs.

7. In a shaker conveyer drive, a conveyer trough line including a plurality of troughs connected together at their ends, and means for reciprocably driving said trough line including a base, a rotating crank, means for driving said crank at a variable angular velocity, a rocking member mounted on said base, a pitman connected between the upper end of said crank and rocking member, and a supporting and driving connection between said trough line and rocking member including a member mounted on said rocking member coaxial with the axis of pivotal connection of said pitman thereto, each of said troughs having a pair of aligned ears projecting laterally from opposite ends thereof, and said connecting member being provided with pockets on opposite ends thereof for receiving said ears, and connecting bolts extending through said ears and connecting member for connecting said troughs together.

8. In a shaker conveyer drive, a conveyer trough line including a plurality of troughs connected together at their ends, mechanism for reciprocably driving said trough line including a base, a casing mounted on said base, a rotating crank journaled therein, drive mechanism disposed within said casing for driving said crank at a variable angular velocity, a rocking member mounted on said base, a pitman extending longitudinally along the longitudinal center of the trough line and connected between said crank and the upper end of said rocking member intermediate the lateral sides thereof, and a supporting and driving connection between said trough line and rocking member including a member extending transversely across said rocking member and pivotally mounted at opposite sides thereof for movement about an axis coaxial with the axis of pivotal connection of said pitman thereto.

9. In a shaker conveyer drive, a conveyer trough line including a plurality of troughs connected together at their ends, mechanism for reciprocably driving said trough line including a base, a rotating crank mounted on said base, means on said base for driving said crank at a variable angular velocity, a rocking member mounted on said base, a pitman journaled on said crank and extending longitudinally along the longitudinal center of the trough line and having connection with the upper end of said rocking member intermediate the lateral sides thereof, and a supporting and driving connection between said trough line and rocking member including a member extending transversely across said rocking member and pivotally mounted at opposite sides thereof for movement about an axis coaxial with the axis of pivotal connection of said pitman thereto, said member extending transversely across said trough line and having supporting and connecting engagement with adjoining ends of said troughs.

10. In a shaker conveyer drive, a conveyer trough line including a plurality of troughs connected together at their ends, mechanism for reciprocably driving said trough line including a base, a rotating crank mounted on said base, means on said base for driving said crank at a variable angular velocity, a rocking member mounted on said base, a pitman journaled on said crank and extending longitudinally along the longitudinal center of the trough line and having connection with the upper end of said rocking member intermediate the lateral sides thereof, and a supporting and driving connection between said trough line and rocking member for driving said trough line and connecting two of said troughs including a member extending transversely across said rocking member and pivotally mounted at opposite sides thereof for movement about an axis coaxial with the axis of pivotal connection of said pitman thereto, each of said troughs having a pair of aligned ears projecting laterally from opposite ends thereof, and said connecting member being provided with means having engagement with the ends of said ears.

11. In a shaker conveyer drive, a conveyer trough line including a plurality of troughs connected together at their ends, mechanism for reciprocably driving said trough line including a base, a rotating crank mounted on said base, means on said base for driving said crank at a variable angular velocity, a rocking member mounted on said base, a pitman extending longitudinally along the longitudinal center of the trough line and connected between said crank and the upper end of said rocking member intermediate the lateral sides thereof, and a supporting and driving connection between said trough line and rocking member for driving said trough line and connecting two of said troughs together including a member extending transversely across said rocking member and pivotally mounted at opposite sides thereof for movement about an axis coaxial with the axis of pivotal connection of said pitman thereto, each of said troughs having a pair of aligned ears projecting laterally from opposite ends thereof, and said connecting member being provided with pockets on opposite ends thereof for receiving said ears, and connecting bolts extending through said ears and connecting member.

12. In a shaker conveyer drive and in combination with a shaker conveyer trough line, a base, a casing mounted on said base, a crank journaled in said casing and projecting outwardly therefrom, a drive connection from said crank to said conveyer trough line, a motor, and a drive connection from said motor to said crank to drive said crank at such a variable angular velocity as to cause material to move along said conveyer trough line when reciprocably driven from said crank including a gear journaled within said casing and including a web, a crank journaled within said casing coaxial with the axis of rotation of said first mentioned crank and eccentric of the axis of rotation of said gear, and a drive connection from said gear to said crank including a sliding block on said crank and a radial guide on the web of said gear adapted to slidably engage said block and cause rotation of said cranks.

13. In a shaker conveyer drive and in combination with a shaker conveyer trough line, a base, a casing mounted on said base, a gear journaled within said casing and including a web having a radial guide formed therein, a crank journaled in said casing eccentric of the axis of rotation of said gear, a block pivotally mounted on the end of said crank whereby rotation of said gear will cause rotation of said crank at a variable angular velocity, another crank projecting from said casing and driven by said first mentioned crank, a rocking member disposed outside of said casing and pivotally mounted on said base, a pitman connected between said last mentioned crank and the upper end of said rocking member, and a supporting member extending transversely beneath the trough line and having supporting and connecting engagement with a pair of troughs thereof, said supporting member being mounted on said rocking member coaxial with the axis of pivotal connection of said pitman thereto.

14. In a shaker conveyer drive and in combination with a shaker conveyer trough line, a base, a casing mounted on said base, a gear journaled within said casing and including a web having a radial guide formed therein, a crank journaled in said casing eccentric of the axis of rotation of said gear, a block pivotally mounted on the end of said crank whereby rotation of said gear will cause rotation of said crank at a variable angular velocity, another crank projecting from said casing and driven by said first mentioned crank, a rocking member disposed outside of said casing and pivotally mounted on said base, a pitman connected between said last mentioned crank and the upper end of said rocking member, and a supporting member extending transversely beneath the trough line and having supporting and connecting engagement with a pair of troughs thereof, said supporting member being mounted on said rocking member coaxial with the axis of pivotal connection of said pitman thereto, and being provided with receiving pockets on opposite sides thereof for supporting and connecting adjacent ends of a pair of troughs of said trough line together.

15. In a shaker conveyer drive and in combination with a shaker conveyer trough line, a base, a casing mounted on said base, a gear journaled within said casing and including a web having a radial guide formed therein, a crank journaled in said casing eccentric of the axis of rotation of said gear, a block pivotally mounted on the end of said crank whereby rotation of said gear will cause rotation of said crank at a variable angular velocity, another crank projecting from said casing and driven by said first mentioned crank, a rocking member disposed outside of said casing and pivotally mounted on said base, a shaft mounted on the opposite end of said rocking member and extending beyond the sides thereof, a member pivotally mounted on the ends of said shaft and having supporting and driving engagement with said trough line, and a pitman mounted on said crank and extending longitudinally along the center of the trough line and having pivotal connection with said shaft intermediate the ends thereof.

16. In a shaker conveyer, a drive connection for directly driving a shaker conveyer trough line from a rotatably driven crank including a pitman pivotally connected to said crank, a rocking member mounted for rocking movement about one of its ends, and a common pivotal connection between the upper end of said rocking member, pitman and a trough of the shaker conveyer trough line, for driving said trough line from said crank and preventing said pitman from causing upward lifting movement of said trough line, upon rotation of said crank.

17. In a shaker conveyer, a drive connection for directly driving a shaker conveyer trough line from a rotatably driven crank including a pitman pivotally connected to said crank, a rocking member mounted for rocking movement about one of its ends, a member secured to and depending from a trough of the shaker conveyer trough line, and a common pivotal connection between the upper end of said rocking member, pitman and depending member, for driving said trough line and preventing said pitman from causing upward lifting movement of said trough line, upon rotation of said crank.

WILLIAM W. SLOANE.